United States Patent
Tscheinig et al.

(10) Patent No.: US 12,010,188 B2
(45) Date of Patent: Jun. 11, 2024

(54) SMART DELIVERY ASSISTANT

(71) Applicant: Dynatrace LLC, Waltham, MA (US)

(72) Inventors: Andreas Tscheinig, Villach (AT); Alois Reitbauer, Linz (AT)

(73) Assignee: Dynatrace LLC, Waltham, MA (US)

( * ) Notice: Subject to any disclaimer, the term of this patent is extended or adjusted under 35 U.S.C. 154(b) by 0 days.

(21) Appl. No.: 18/303,063

(22) Filed: Apr. 19, 2023

(65) Prior Publication Data
US 2023/0353644 A1    Nov. 2, 2023

Related U.S. Application Data

(60) Provisional application No. 63/335,369, filed on Apr. 27, 2022.

(51) Int. Cl.
*G06F 15/173* (2006.01)
*H04L 41/12* (2022.01)
*H04L 67/51* (2022.01)

(52) U.S. Cl.
CPC .............. *H04L 67/51* (2022.05); *H04L 41/12* (2013.01)

(58) Field of Classification Search
CPC ................................ H04L 67/51; H04L 41/12
USPC ......................................... 709/201, 223, 224
See application file for complete search history.

(56) References Cited

U.S. PATENT DOCUMENTS

| | | | | |
|---|---|---|---|---|
| 7,814,142 B2 * | 10/2010 | Mamou | ........... | G06Q 10/10 |
| | | | | 709/224 |
| 8,060,553 B2 * | 11/2011 | Mamou | ........... | G06Q 10/10 |
| | | | | 709/223 |
| 8,078,564 B2 * | 12/2011 | Willis | ........... | G06N 5/04 |
| | | | | 706/50 |
| 10,896,175 B2 * | 1/2021 | Robichaud | ........... | G06F 16/242 |
| 11,785,104 B2 * | 10/2023 | Erlingsson | ........... | G06F 16/906 |
| | | | | 709/224 |
| 2012/0110093 A1 * | 5/2012 | Tingstrom | ........... | G06F 16/957 |
| | | | | 709/206 |
| 2014/0130036 A1 * | 5/2014 | Gurikar | ........... | G06F 8/62 |
| | | | | 717/176 |
| 2021/0255847 A1 * | 8/2021 | Jean-Louis | ........... | G06F 8/63 |
| 2022/0121689 A1 * | 4/2022 | James | ........... | G06F 16/24568 |

FOREIGN PATENT DOCUMENTS

AU         2013359762 B2    2/2016

* cited by examiner

*Primary Examiner* — Liang Che A Wang
(74) *Attorney, Agent, or Firm* — Harness, Dickey & Pierce, P.L.C.

(57) ABSTRACT

A technology is disclosed for automated risk analysis for the deployment of software component updates in complex microservice architectures. Dependencies and versions of deployment situations in test setup environments and in a target environment are analyzed and compared to identify a version delta between tested and production deployments. Further, test results for test deployments are used to identify and remove unsuccessful test setups. Successful test setups are ranked according to extend of their version delta against the target environment and one of the successful test setups is selected according to a deployment strategy. After a test setup is selected, a deployment plan considering service versions and dependencies is generated that guarantees a tested and functional state of the target environment after each deployment step.

23 Claims, 11 Drawing Sheets

System Overview

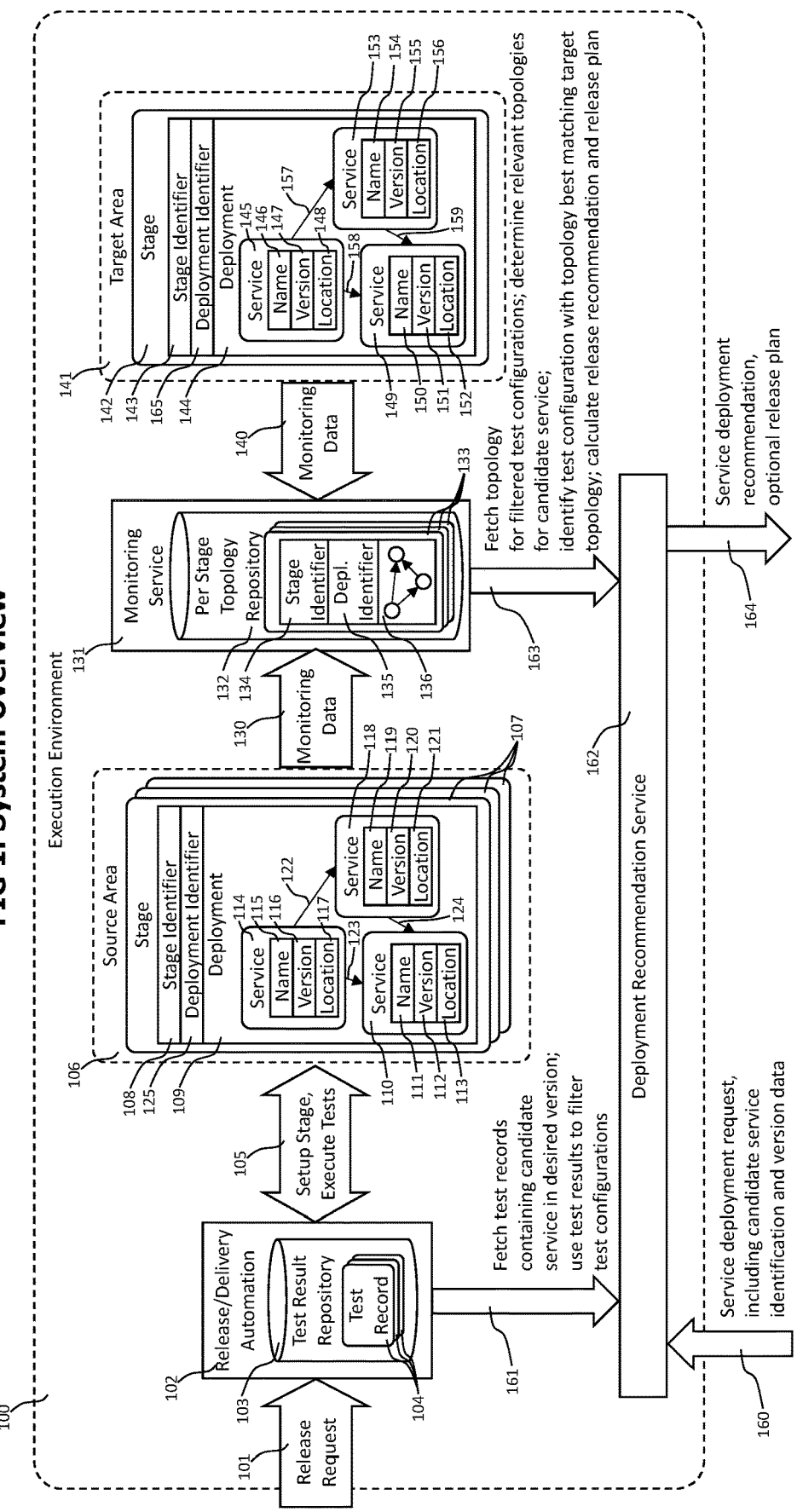
FIG 1: System Overview

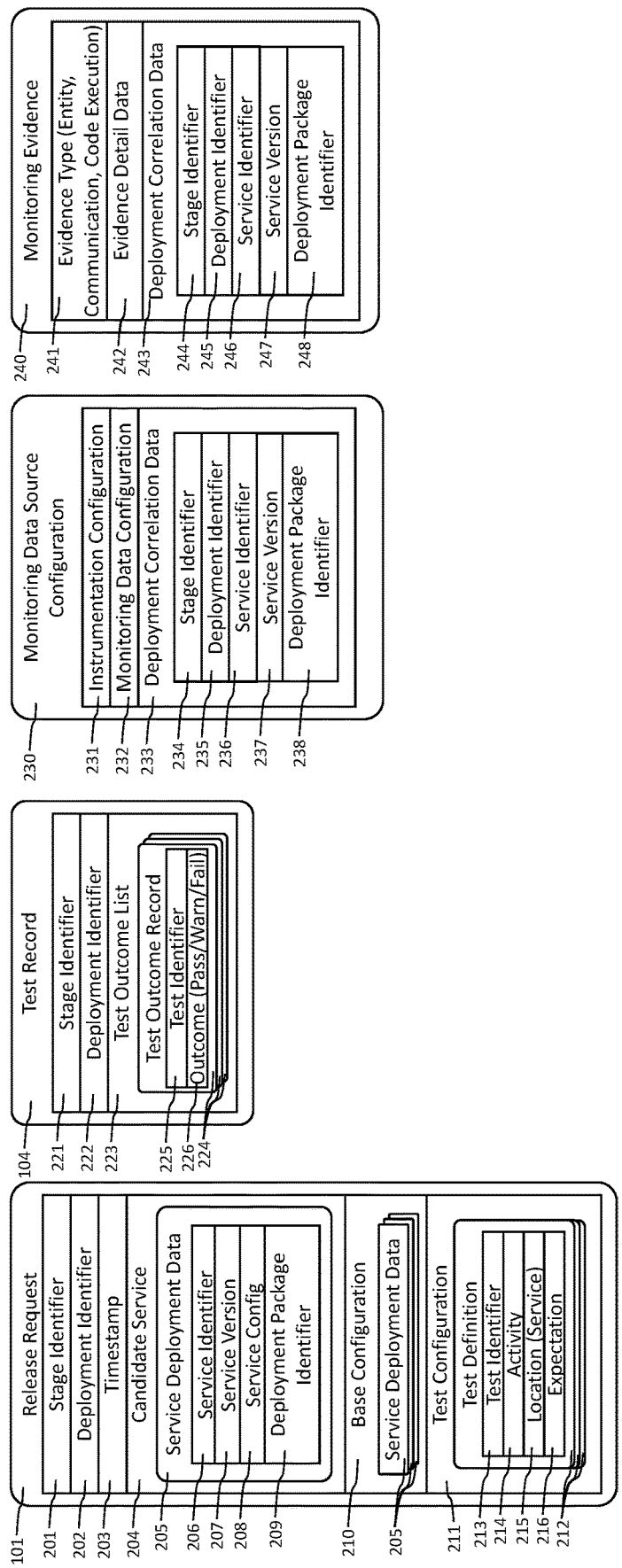
FIG. 2: Release and Monitoring Related Data Records

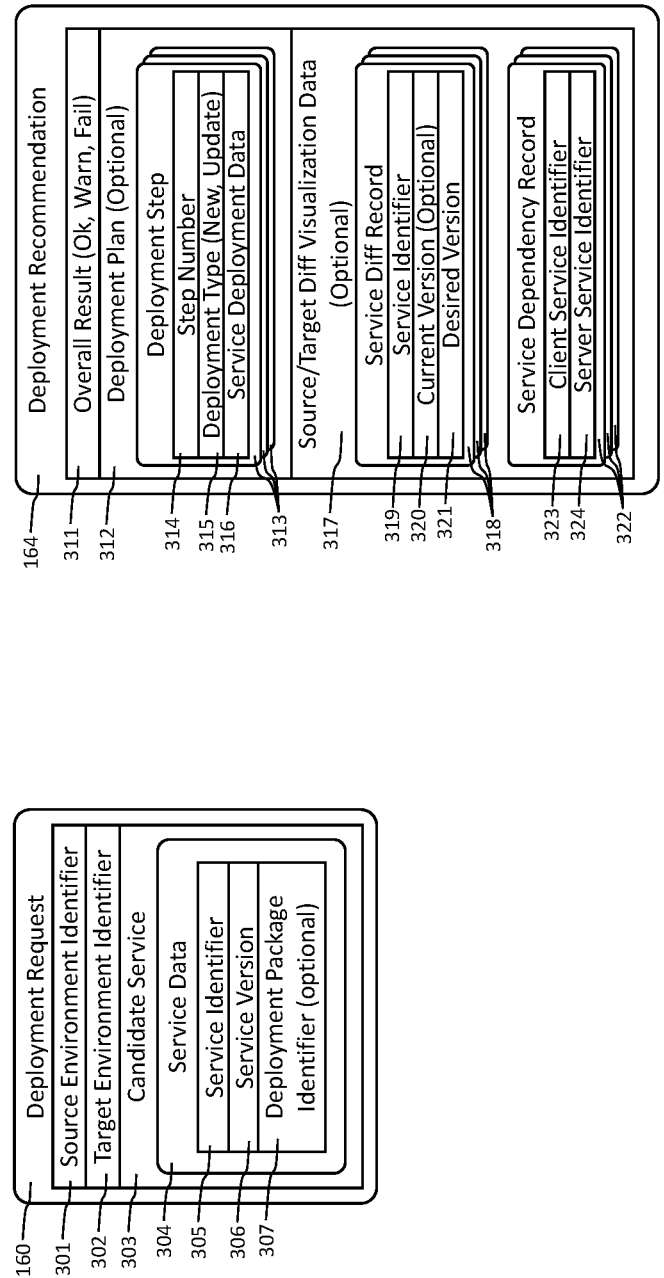
FIG. 3: Deployment Related Data Records

FIG 4: Monitoring Activities
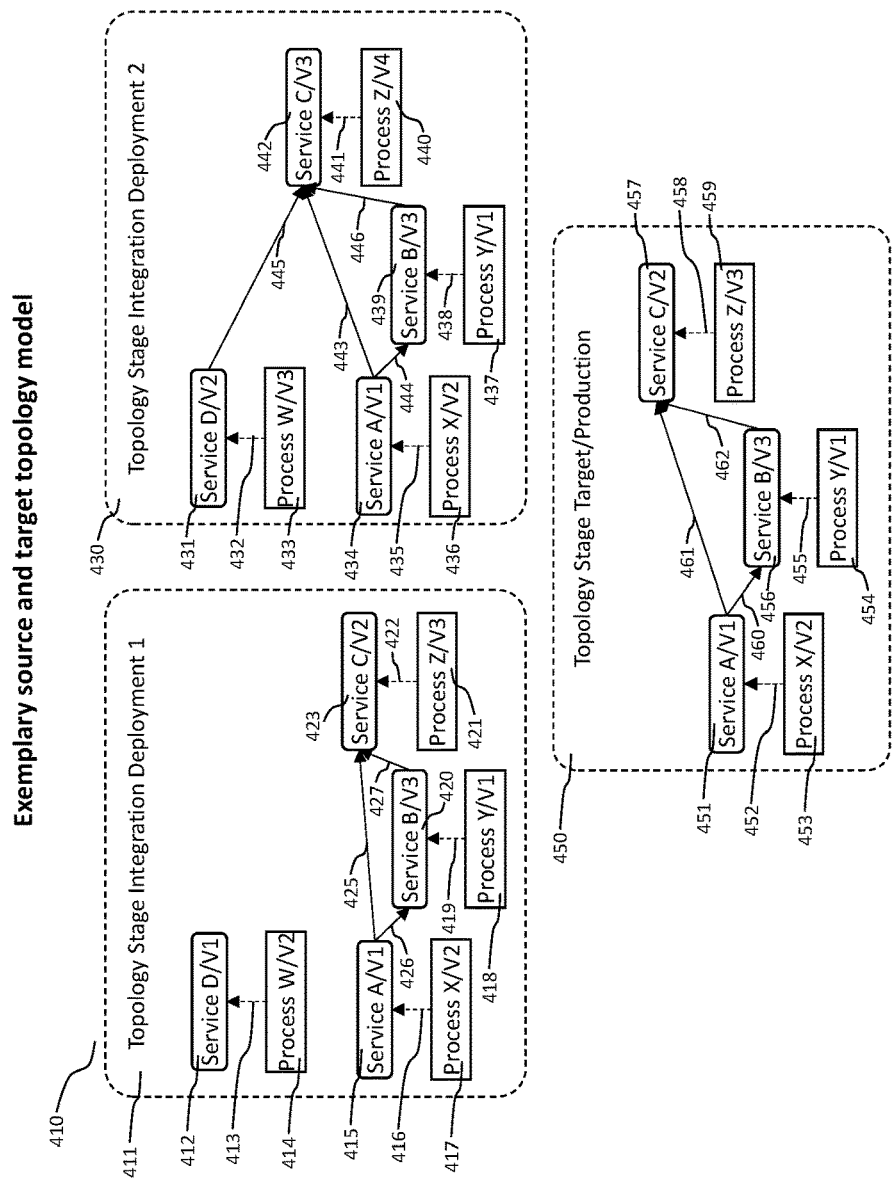
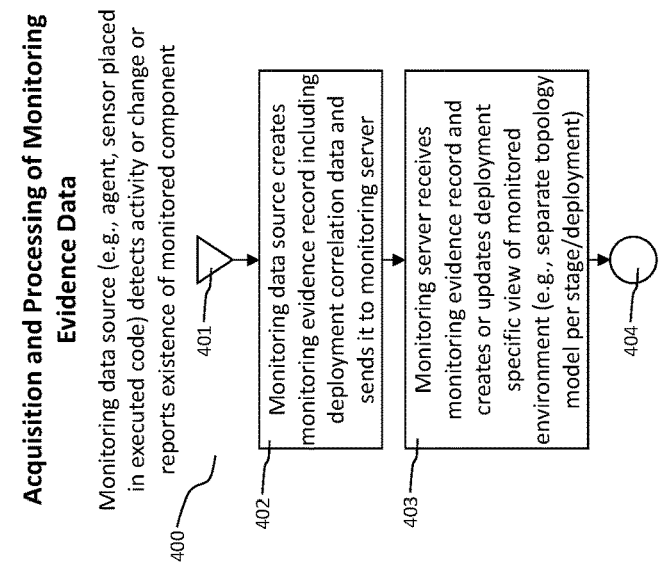

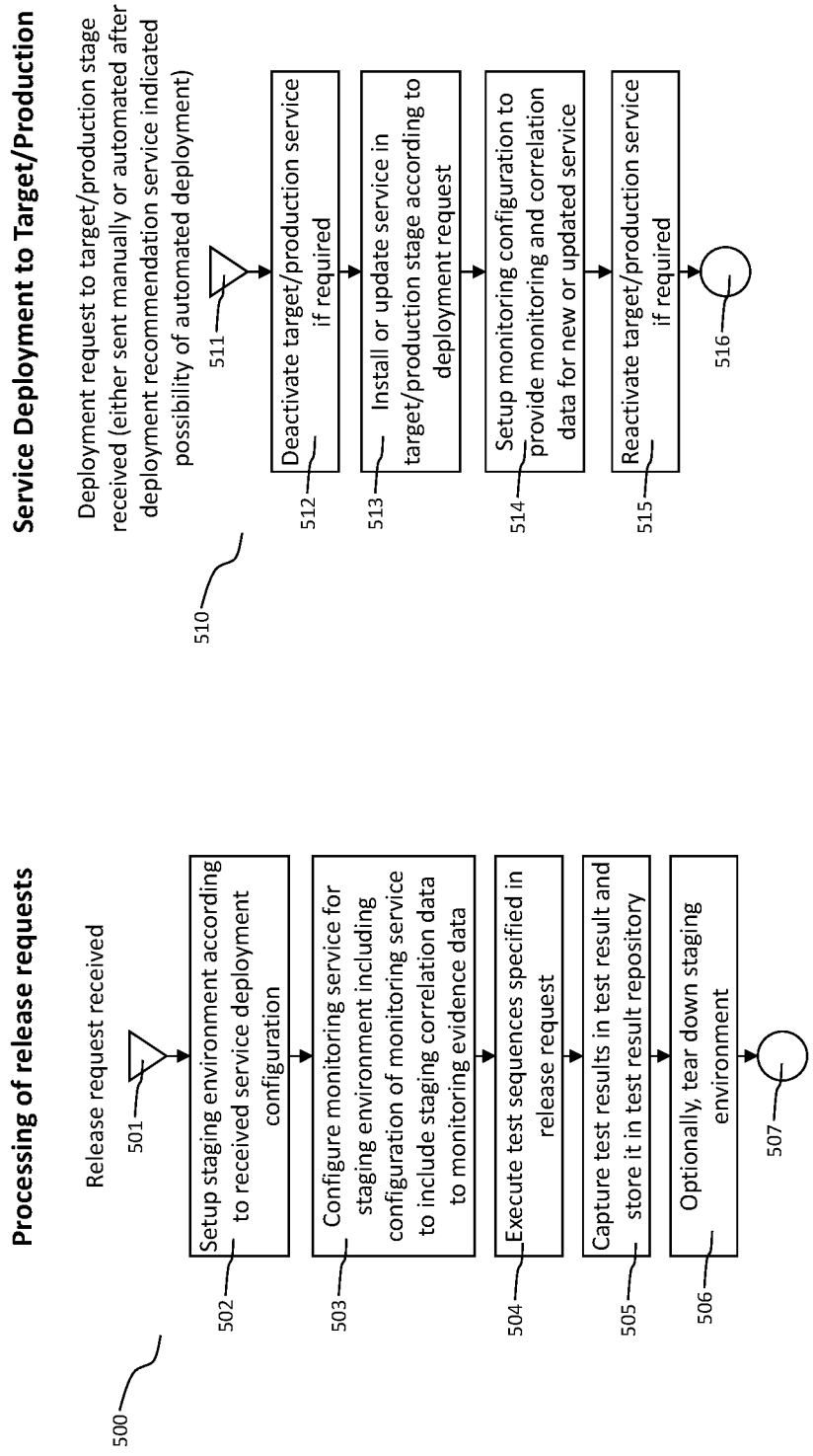
FIG. 5: Deployment and Release Activities

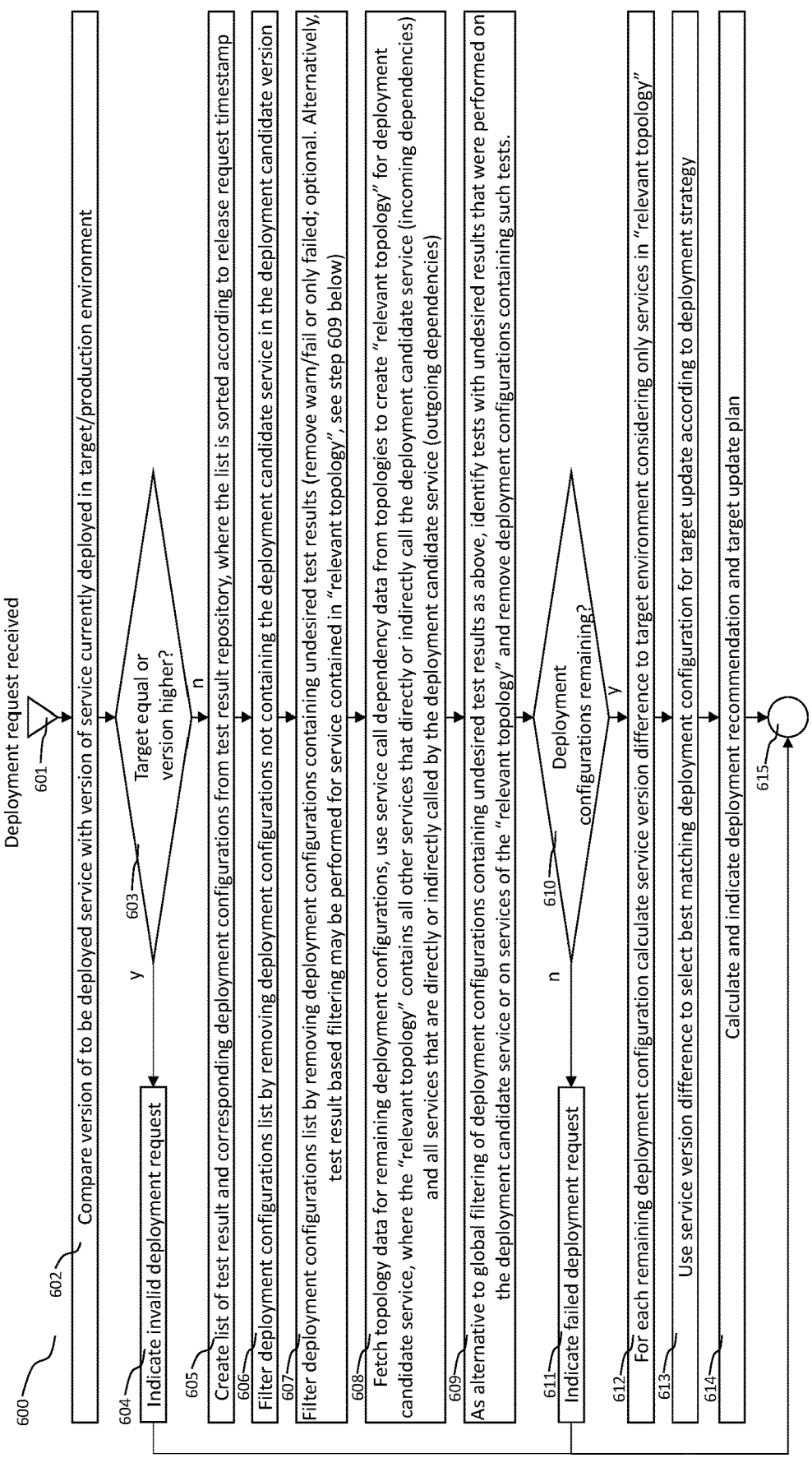
FIG. 6: Deployment Recommendation Generation

FIG. 7 Determination of Relevant Topology
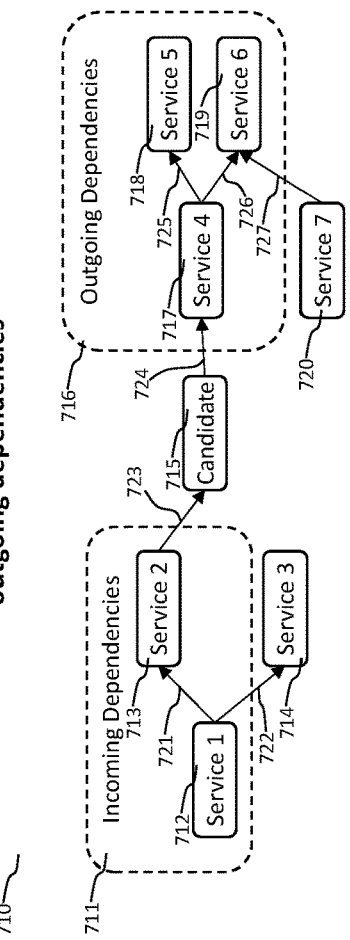

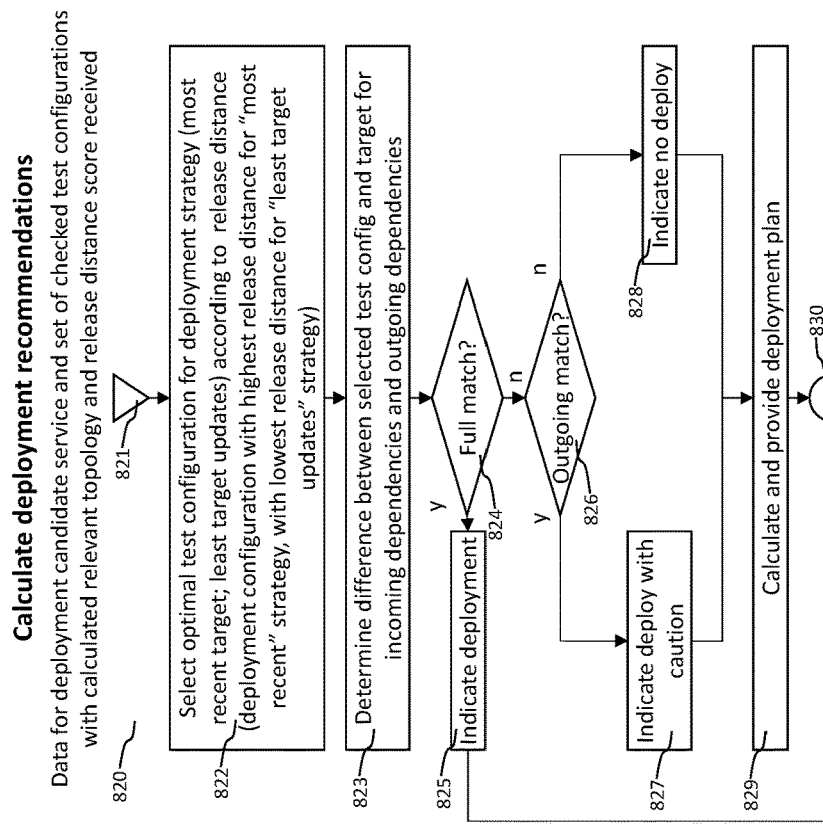
FIG. 8: Deployment Recommendation Calculation

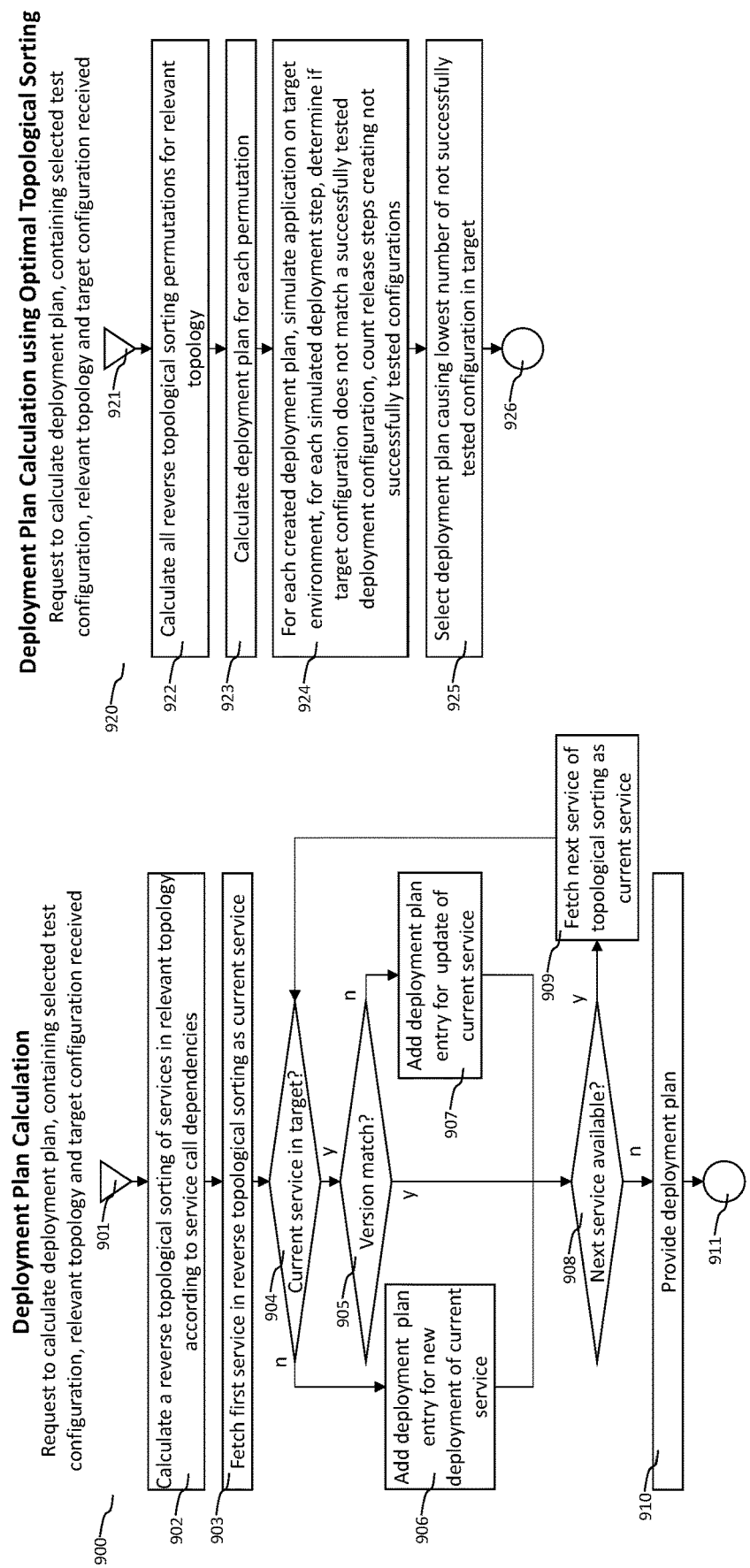
FIG. 9: Calculate Deployment Plan

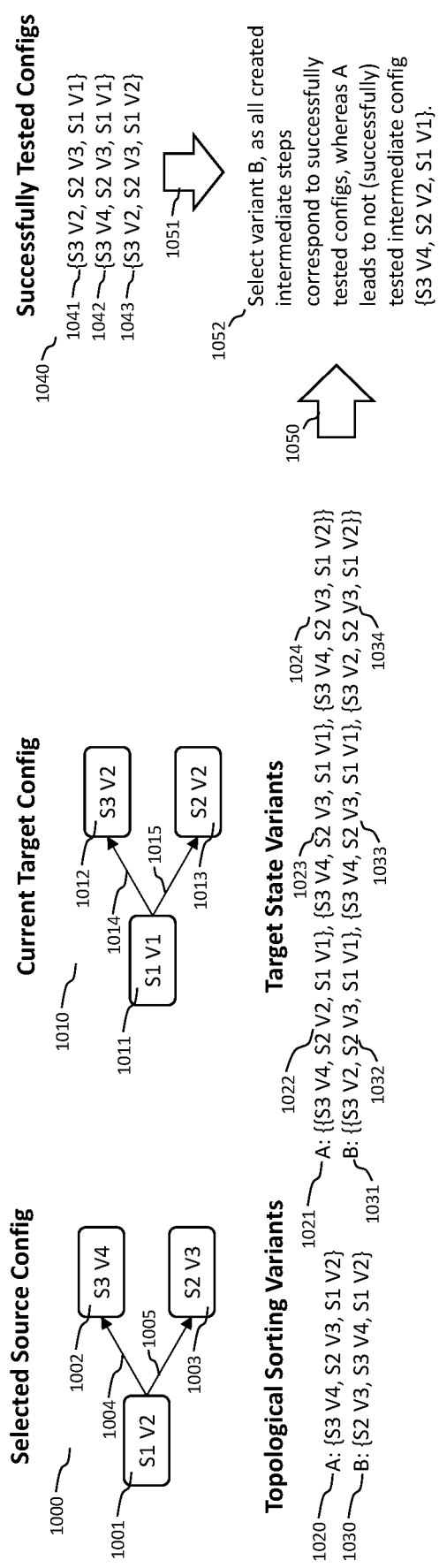
FIG. 10: Exemplary Visual Description of Optimal Deployment Plan Selection

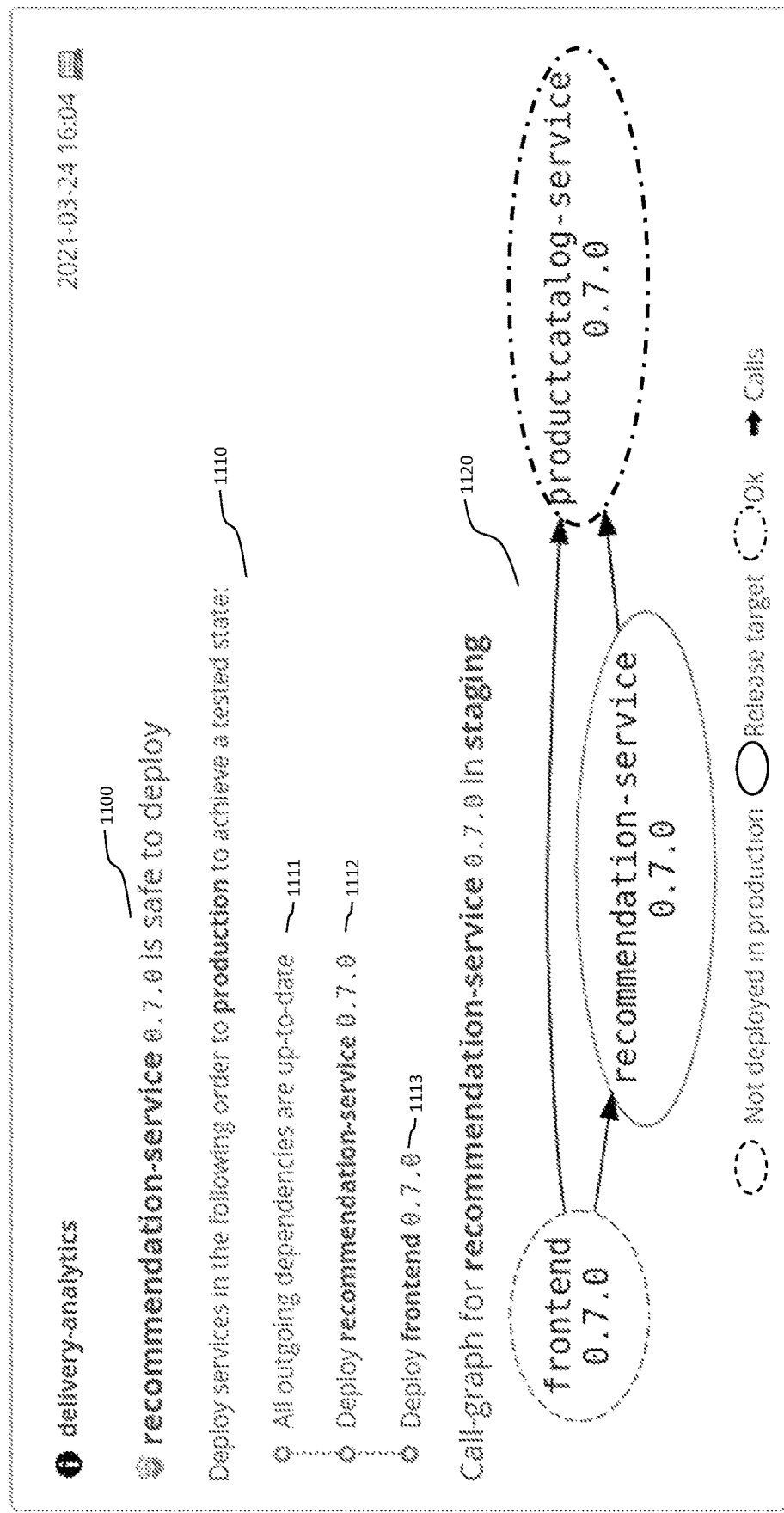
FIG. 11: Exemplary Screenshots of Deployment Recommendation Visualization

SMART DELIVERY ASSISTANT

FIELD

This application claims the benefit of U.S. Provisional Application No. 63/335,369, filed on Apr. 27, 2022. The entire disclosure of the above application is incorporated herein by reference.

FIELD

The invention generally relates to the field of release management for micro-service-oriented applications and more specifically to quantify the risk for releasing a specific version of a micro-service to a target environment by analyzing inter-service dependencies, test results and version differences between test and target environments.

BACKGROUND

Application development benefits from recent architectural, execution environment related and work-organizational changes. First, micro-service-oriented architectures decouple functional modules of applications and enable the separated development, test, and deployment of individual functional modules of applications. Second, cloud computing environments combined with deployment automation and operation orchestration systems like Kubernetes enable fast deployment processes, automated creation and destruction of test scenarios and automated build and deployment pipelines simplify deployment processes as they reduce manual deployment tasks to a minimum. Third, new development activity paradigms like agile development, enable individual teams to work autonomously on their local development goals and to test, release and deploy functional modules independently.

Although this management and technological context boosts productivity of development teams as it minimizes interdependencies and it enables fast reactions to changing user and environment related demands, because delivery and deployment of individual functional modules or service implementations, deployment of new software version of individual services still represents a considerable risk. Although dependencies between individual services may be loose, as they do not interact directly but via an interconnecting computer network, those dependencies still exist on a functional level, and an application as a whole may fail if communication between services that are themselves and locally are working as designed, fails.

Development teams are typically responsible for one or only a small subset of services and drive the development, test, and release process of those services more or less independently, with only high-level coordination with other teams.

Test environments are typically established containing the complete or at least a majority of the overall developed application, into which a to-be-released version of a service component is then deployed. Afterwards, tests covering functional and non-functional properties are executed in this test environment. If those tests succeed, the tested version of the service component is released for deployment.

However, multiple development teams perform this development, test, and release activities in a parallel and only sparsely coordinated fashion.

The release of a new (software) version of a service typically includes the execution of various tests which are performed in separated test environments closely aligned to the target/production environment to which a successfully tested newer version of a service should be deployed. Setup of those test environments, execution of tests and evaluation of test results is typically performed in a highly automated fashion using deployment orchestration and automation infrastructure like Kubernetes.

Although it is desired to create test environments that match the target environment as closely as possible, it is not possible in practice in highly productive, agile development organizations to create test setups for a software component that perfectly match the target setup. Major reason for this is that multiple development teams develop, release, and deploy new versions of the services managed by them in parallel. Therefore, even if version configuration of test and target setup match before test execution, they may already differ after test execution due to deployments into the target environment performed by other teams.

Therefore, deployment of a new service version to a target environment represents a considerable risk, even if all tests performed in the test setup succeeded, because the target environment may not be in-sync with the environment in which the testing was performed.

To address this risk, development environments tend to implement a manual synchronization step, in which parallel service deployments are synchronized and serialized to perform final tests in test environments that are guaranteed to be identical with the current target environment to which a given new service version should be deployed. However, this approach requires considerable manual intervention, slows down the deployment process and hampers the agility and flexibility of development organizations to react on environment changes, new customer demands or on emerging failures. This may even lead to "big-bang" style deployment strategies, in which continuous service update releases are gathered and then deployed to the target environment in "big-bang" update events, which thwarts the aims of continuous software delivery approaches.

Consequently, there is demand in the art that eases and automates risk evaluation for the deployment of new service versions into a target environment that takes not only into account the results of tests performed on the new service version in a test environment, but also deployment deviations between test and target environment.

This section provides background information related to the present disclosure which is not necessarily prior art.

SUMMARY

This section provides a general summary of the disclosure, and is not a comprehensive disclosure of its full scope or all of its features.

This disclosure is related to a release and deployment recommendation system for services that are part of a service-oriented application, which generates deployment recommendations for individual service updates that are based on monitored test results, service call dependencies and service version differences between staging environments in which tests were executed and a target environment into which a released serviced update should be deployed.

Data from release and deployment automation systems which automatically create test environments, perform tests, report, and evaluate test results are combined with data from monitoring systems which recognize and monitor calls between services and creates a topology model describing call dependencies between services. In addition, version data describing the versions of services deployed to test environments and to the target environment are gathered and used to enrich topology models with version information.

Topology data may be used to identify dependency relationships for a to be updated service. Incoming dependencies represent those services that directly or indirectly (i.e., via one or more intermediate services) call the deployment candidate service and outgoing dependencies represent those services that are directly or indirectly called by the candidate service. Outgoing service call dependencies may also be referred to as descendent relationships and incoming service dependencies may also be referred to as ancestor relationships. The set of call-dependency related services and the versions of those services may be determined for test environments in which the candidate service was tested before its release and for the target environment into which the service should be deployed.

Deviations of service versions between call-dependency related services in a test environment and their counterpart in the target environment are determined and release recommendations may be performed based on those deviations. In case a version deviation is only detected for the candidate service, which means that test and target environment are in-sync, the recommendation system may indicate a save deployment of the candidate service.

For detected additional version deviations in the incoming dependencies of the candidate service, a deployment with caution may be indicated by the recommendation system. In this case, all services that are directly or indirectly called by the candidate service are in-sync, only services that call the candidate service are out of sync and may need to be updated in addition to the candidate service. Considering backwards compatibility between services (i.e., a service that was capable to process an incoming message before an update is also capable to process it afterwards), which is common and desired behavior in practice, the candidate service can be deployed immediately, as this would not break any functionality. Outdated services performing incoming calls will still work due to backwards compatibility, but it may be required to update them later.

If version deviations are detected in outgoing dependencies of the candidate service, an immediate deployment is not possible, as the candidate may send messages to its outgoing dependencies that are not supported by the currently deployed versions of those outgoing dependencies. Therefore, the recommendation system may indicate that a deployment of the candidate is not possible.

A release plan may be calculated by the recommendation system in case of deviations detected in incoming or outgoing dependencies of the candidate services. The release plan may describe a sequence of service updates for services with deviating versions where a given service is only updated to a newer version after all its outgoing dependencies were already updated to a version that is capable to process all requests that the given service may send after being updated.

It is assumed by the recommendation system that services in the target environment are always upgraded. More specifically, if a given service in the target environment has version 2, it is only possible to deploy version 3 or 4 of the given service, but it is not possible to deploy version 1. As new service versions typically provide additional functionality, bug fixes or performance improvement, a downgrade of a service version is uncommon and also unlikely.

In some variant embodiments, multiple test environments may be created and used to test a candidate service before its release. In such embodiments, the call-dependency service sets for the deployment candidate service, and version deviations to the target environment may be calculated for every test environment. One of the test environments may be selected as base deployment configuration for the recommendation system. Various strategies may be used to select the test environment that is used by the recommendation system. One example strategy may aim to update the target environment as fast as possible and choose the test environment having the highest version difference to the target system. Another example strategy may try to minimize updates of the target system and choose the test environment having the service version configuration that is most similar to the target environment.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1 Provides a system overview of a combined software delivery and operation monitoring environment including a deployment recommendation system.

FIG. 2 Shows data structures to store release requests, test results, monitoring configurations and monitoring data.

FIG. 3 Describes data structures to describe deployment requests and to provide deployment recommendations.

FIG. 4 Shows activities performed to monitor test and target environments in addition to exemplary test and target configurations.

FIG. 5 Provides flow charts describing the processing of a release request for an updated version of a specific service and the processing of deploying a new service version to a target environment.

FIG. 6 Depicts the flow chart of the overall process that creates deployment recommendations for received deployment requests, including the identification of test configurations that match the requested deployment.

FIG. 7 Shows the flow chart of a process that calculates for a deployment candidate service the set of services that potentially impact the candidate service and the set of services that are potentially impacted by the candidate service.

FIG. 8 Shows the flow charts of processes that quantify the difference between a selected source/test configuration and a target configuration and of a process that provides deployment recommendations based on differences between source/test and target configuration.

FIG. 9 Provides flow charts of processes that generate a deployment plan that transfers a target configuration into a desired updated configuration aligned to a selected source/test configuration. Generated deployment plans consider service compatibility relations to specify sequences of deployment steps which guarantee a working target environment after each deployment step.

FIG. 10 Visually describes the selection of an optimal deployment plan which considers successfully tested configurations for the selection of deployment steps.

FIG. 11 Shows an exemplary visualization of deployment recommendations including a calculated summary deployment recommendation and a sequence of deployment steps to realize a requested deployment.

DETAILED DESCRIPTION

Example embodiments will now be described more fully with reference to the accompanying drawings.

The disclosed technologies are directed to evaluate and quantize the risk of deploying a new service or an update to an existing service to a production environment of a microservice application. Deployment requests specifying a service and version of the service that should be deployed are received and trigger an analysis of the interaction environment of the candidate service (services from which the candidate service receives requests and services to which it sends requests), and of test environments and test results of tests performed for the candidate service. Test environments in which successful tests of the candidate service were executed are selected, and a version deviation between those successful test environments and the target environment is calculated. One of the successful test environment is selected as deployment base using the calculated version deviations. In some cases, a deployment plan is created which defines a sequence of service update/deployment steps, where the sequence of the deployment steps guarantees a fully functional application after each individual service deployment.

Data from a release/delivery system which manages the release of new service versions by automatically creating test environments, performing tests in those environments and gathering and evaluating test results are combined with monitoring data describing call dependencies between different services from both test and target environments are combined. The combined data is used as basis for the decisions of the deployment recommendation system.

Coming now to FIG. 1, which shows a block diagram of a typical environment in which a deployment recommendation system operates. An execution environment 100 is containing and executing a release/deployment automation system which maintains a source area 106 for the automated creation of test stage environments 107 for test executions on received release requests 101, a target area 141 executing a productive deployment of an application, a monitoring service 131 receiving monitoring data 130 and 140 from testing and production deployments and a deployment recommendation service 162. An exemplary execution environment is the container execution and orchestration platform Kubernetes, which is capable to manage multiple individual computing hosts to create an abstract execution environment in which then various different application, or different versions of the same application may be executed in a virtually isolated way. Some embodiments may execute release and delivery automation system and production deployment in different execution environments and also execute separate monitoring service instances for release and delivery and for production. As long as the deployment recommendation service has access to the test result data generated by release and delivery automation system and to the monitoring data generated by the monitoring service instance, such a separation has no influence on the functionality of the deployment and recommendation service.

On receipt of release requests 101 the release and delivery automation system 102 may create a new deployment stage 107 in the source area 106, setup 105 a test deployment 109 in the new deployment stage and perform a set of automated tests on the test deployment. A test record 104 may be created after the tests were executed and stored in a test result repository 103 of the release and delivery automation system.

A deployment stage 107 may contain but is not limited to a stage identifier 109 which uniquely identifies a deployment stage and a deployment area 109 into which a set of services 110, 114 and 118 may be deployed. Those services may interact 122, 113 and 114 with each other to realize application functionality. After setting up a deployment stage in the source area, the release and delivery automation system may execute a set of tests on the created service network, e.g., by sending sequences of requests to one or more of the services of the service network, receiving responses for those requests and comparing them with expected responses that indicate correct functionality of the service network. Results of those test executions may be stored in a test result repository 103 in form of test records 104. Each of the deployed services 110, 114, and 118 may be identified by a service name 111, 115, and 119 and a service version 112, 116, and 120. Location data of services 113, 117 and 121 may identify processes providing those services, e.g., by name and location of binaries executed by those services or by names and network addresses of host computing systems executing those services.

Test executions trigger activities on individual services and also interactions between those services, like sending of requests and receiving of responses to those requests. The monitoring service 131 may instrument the services 110, 114, and 118 and processes (not shown) providing those services with monitoring agents (not shown) that generate and provide monitoring data 130 describing individual services, processes providing those services, requests and responses sent and received by those services. The generated monitoring data may contain data identifying the area of the execution (106 or 141) and the deployment stage (107 or 142) from which the monitoring data was received.

The monitoring service 131 may use the received monitoring data 130 to create "per stage/per deployment" topology models 133 of monitored deployment stages. Those "per stage/per deployment" topology models 133 may contain but are not limited to a stage identifier 134 and a deployment identifier 135, which in combination identify a specific modeled deployment stage (107 or 142) by its stage and deployment identifier (108/125 or 143/165) and a topology model 136 representing and describing the services that were observed in the deployment stage, the communication activities of those services in form of requests and responses exchanged between those services, processes providing those services, and the host computing systems executing those processes. Monitored service communication activities may be modelled as directed edges in a topology model connecting two nodes representing services that performed the communication. The direction of the service communication edge may point from the service sending a request to the service receiving the request. This kind of topology model may also be referred to as service call dependency graph as it reveals the dependencies of services that send a request from services that receive and process the requests to create and return a corresponding response.

A target area 141 contains production deployment stage 143, which also contains a stage identifier 143 and a deployment environment 144. This deployment environment may contain services 145, 149, and 153 which are identified by service names 146, 150, and 154 and a service version 146, 151 and 156. In addition, location data 148,152, and 156 may be available describing the processes providing those services and the host computing systems executing those processes.

Stage identifiers 108/143 may be used to specify a purpose of a deployment, like for testing and release activities, specific testing aspects, like "functional testing", "performance testing" or "hardening". For production environments, the staging identifier may be set to "production", or it may be omitted. The deployment identifier 125 may be used to identify individual deployments, to distinguish between different deployments for the same (testing) stage. As the production environment is typically only updated and not replaced entirely, the deployment identifier may be omitted in production environments, or it may be used as to version the entire production environment, where the deployment identifier is simply a counter which is incremented with each successful deployment to the target environment. It is noteworthy that source area 106 and target area 141, are technically identical concepts that serve different purposes, namely the source area being used for testing of new service versions in production-like scenarios, and the target area for the execution of a service network to provide real service functionality to real application customers in a production environment.

Monitoring agents may be injected into components deployed to the production stage and provide monitoring data 140 to the monitoring service 131 which creates a "per stage/per deployment" topology model 133 for the production deployment.

The deployment recommendation service 162 may receive service deployment requests, which define a specific version of a specific service for which a deployment to the production environment is desired. On receipt of such a deployment request, the deployment recommendation service 162 may first fetch 161 test records 105 describing tests of the specific service in the specific version and then fetch 163 "per stage/per deployment" topology models 136 for the testing stages 107 in which those tests were performed and the "per stage/per deployment" topology model 136 for the target production deployment.

The deployment recommendation system may use fetched testing data to identify test environments in which all tests were executed successfully and monitoring data including service call dependency topology data to identify the impact radius (services directly or indirectly calling the deployment candidate service and services that are directly or indirectly called by the deployment candidate service) of the deployment candidate service in successful test environments and in the target environment. Further, version numbers of services deployed to successful test environment and the target environment that are contained in the impact radius of the deployment candidate service are analyzed and compared to determine a version distance between each successful test environment and the target environment. Based on the version distance, a successful test environment is selected and used as basis for a deployment to the target environment. In case version differences also exists for services other than the deployment candidate service, a deployment plan is generated describing a sequence of service deployments to the target environment that guarantee a functional target environment during the whole deployment process. The deployment recommendation system creates a service deployment recommendation response 164 containing a general deployment recommendation and, if required, also a deployment plan.

Coming now to FIG. 2, which provides data records that may be used to communicate release requests for individual services, store test results for service release attempts for the configuration of monitoring activity and for the transfer of monitoring data.

A release request record 101, may be used to notify the release and delivery management system that a new software version of a service is ready for testing and, in case of successful test executions, also ready to be released.

A release request record 101 may contain but is not limited to a stage identifier 201, which may be used to specify a certain test aspect for the service, like integration, performance, penetration or hardening, a deployment identifier 202, which identifies a specific deployment of a test environment for a testing stage, timestamp information 203 holding data describing sending and receipt of the release request, candidate service data 204, which specifies the an identifier for the service and the version of the service that should be released in form of service deployment data 205, a base configuration section 210 containing service deployment data 205 for additional services that need to be deployed to the testing environment, and test configuration data 211, which specifies the testing sequences that should be executed on the serviced deployed to the testing environment in form of test definitions 212.

Service deployment data 205, which contains data and resources required to deploy a specific service of a specific version to a deployment environment may contain, but is not limited to a service identifier 206, a service version 207, service configuration data 208 and a deployment package identifier. Service identifier, version and deployment package identifier may be used to identify and fetch the software component representing the service, like e.g., a container image containing a process executable that provides the service functionality. Service configuration data 208 may be used to deploy and configure a service in an execution environment in a way that it provides service functionality as desired and that it also interacts with other services deployed to the execution environment as expected.

A test definition 212 contains data required to execute a test and evaluate test outcome. A test definition may contain but is not limited to a test identifier 213, identifying the test specified by the test definition, a test activity specification 214, defining a sequence of activities representing the test-stimulus, like a set or sequence of requests that should be sent, location data 215, e.g., identifying the service to which the requests specified in the activity data 214 should be sent, and expectation data 216, defining e.g., responses to applied activity data that indicate that the tested service configuration works as expected.

Test records 104 may be used by the release and delivery automation system 102 to store test documentation and result data for received release requests and corresponding test executions and outcomes. A test record may contain but is not limited to a stage identifier 221 and a deployment identifier 222, identifying the deployment environment in which the test was performed and a test outcome list 223 containing the test result description in form of test outcome records 225.

A test outcome record 224 may contain a test identifier 226 identifying the test definition 212 which was executed to create the described test outcome, and a test outcome section 226, at least specifying a status of the test result, like "pass" for successful test, "fail" for a clearly failed test, "warn" for partially successful test or a test execution that indicates only fulfillment of basic requirements but not a completely successful test execution. The test outcome may be determined by comparing actual responses of the tested environment/service to test activity with expected responses, as defined in the expectation section 212 of a test definition.

A monitoring data source configuration record 230 may be used by the monitoring service module 131 to configure acquisition of monitoring data, like the injection of agents into processes providing services and configuration of these agents to instrument code that is executed by those services. A monitoring data source configuration 230 may contain but is not limited to instrumentation configuration 231 and monitoring data configuration 232, which may be used to specify how components (e.g., a process providing a service) of a deployment environment are manipulated (e.g., by injecting agents which then instrument code), and which amount and kind of monitoring data those manipulations should generate and provide. Further, a monitoring data source configuration 230 may also contain deployment correlation data 233, which specifies the target environment to which the instrumentation manipulations are directed.

A deployment correlation data record may contain but is not limited to a stage identifier 234 and a deployment identifier 235 which define the deployment environment in which the component that is targeted by the instrumentation configuration is located, service identifier and service version location identifying the service that is targeted by the instrumentation and a deployment package identifier 238 which identifies the component containing the service functionality, like a container image or process executable. Deployment correlation data 233 may also be used to tag monitoring data as additional information describing the origin of the monitoring data.

Monitoring evidence data records 240 may be used to transfer monitoring data generated by monitoring data sources like agents deployed to components of a monitored deployment environment to a monitoring data receiver like monitoring service component 131.

A monitoring evidence data record 240 may contain but is not limited to an evidence type indicator 241, specifying the type of provided monitoring data, like measurement data, topology data or transaction trace and correlation data, evidence detail data 242 containing detailed observation data of the type specified by the evidence type indicator, e.g., in form of measurement data, topology data records or transaction trace and correlation data fragments. A monitoring evidence data record 240 may in addition contain a deployment correlation data record 243, containing data identifying the deployment environment from which the monitoring data was received.

A deployment correlation data record 243 may contain but is not limited to a stage identifier 244, a deployment identifier 245 and a service identifier 246 specifying the origin of the monitoring data, service version data 247 specifying the version of the service from which the monitoring data was received, and a deployment package identifier 248, specifying the component package or release and deployment unit containing the service from which the monitoring data was received, like an identifier for a container image or a process executable containing the code for a monitored service.

Data records for communication with a deployment recommendation service module 162 are shown in FIG. 3.

A deployment request 160 may be used to initiate the deployment of a specific version of a specific service to a target area 141, for usage in a productive environment. Such a deployment request may be received by a deployment recommendation service, which analyzes results previously executed tests of the to be deployed serviced version and the differences between the environments used to perform those test and the desired target environment, to generate a deployment recommendation for the to be deployed service version.

A deployment request 160 may contain but is not limited to source environment identifier data 301, which may e.g., identify a source area 106 in which testing of service components is performed and in addition one or more stages of the source area in which tests of the candidate service were performed, target environment identifier data 302, which identifies the target/productive environment to which the candidate service should be deployed, e.g., in form of an identifier for a target environment area 141 and in addition also stage identification data for a target stage within the target environment area, and candidate service data 303 containing service data 304 which specifies the deployment candidate service.

Service data 304 may contain but is not limited to a service identifier 305, which may specify the name of the to be deployed service, a service version 306, which specifies which version of the service should be deployed, and an optional deployment package identifier, identifying the deployment unit containing the to be deployed service functionality, like an identifier for a container image, or process executable containing the functionality of the deployment candidate service.

A deployment recommendation response 164 may be created by deployment recommendation service module 162 as response to a received deployment request 160.

A deployment recommendation response may contain but is not limited to an overall deployment recommendation result, indicating whether the requested deployment is generally possible ("ok), possible, but additional updates of the target environment are recommended ("warn", "with caution") or not possible ("fail"), optional deployment plan data 312, which specifies a list of service deployment steps, if deployments/updates of other services than the candidate service are recommended, and data describing the difference between a selected source/test deployment environment and the target deployment environment in terms of differences of deployed services and versions of deployed services.

Deployment plan data 312 may contain a list of deployment step records 313, where a deployment step record may contain but is not limited to a deployment step number 314, specifying a recommended deployment sequence, a deployment type indicator 315, which distinguishes between new service deployments (a corresponding service is not yet existing in the target environment) and service updates (a corresponding service with an older version already exists in target), and service deployment data, specifying name and version of the to be deployed service, optionally also the version of the service that is currently deployed in the target environment and will be replaced by the deployment step.

Source/target difference data 317, which may be used to visualize the difference between a selected source deployment environment and the target deployment state may contain but is not limited to a set of service difference records 318, which define, for individual services, the version difference between source and target, and service dependency records 322, which define call dependencies between services, as observed in either the source or target environment.

Service difference records 318 may contain but are not limited to service identification data 319, identifying a specific service, e.g., by its name, an optional current service version 320, indicating the version of the service that is currently deployed to the target environment (current version may not be available if the service is not yet deployed to the target environment), and a desired version 321, specifying the version of the service that should be deployed to the target environment.

Service dependency records 322 may be used to describe call dependencies (transaction trace or other monitoring data indicating that a first service sent at least one request to a second service) observed either in the source or the target deployment environment. A service dependency record 322 may contain but is not limited to a client service identifier 323, which identifies the client that sent an observed request and a server service identifier 324, identifying the service that received and processed the request.

Coming now to FIG. 4, which conceptually describes the monitoring activities performed by the monitoring service in source and target deployment environments, and some exemplary service call topology models that may be created by the monitoring service module out of monitoring data.

The process of monitoring deployment environments (i.e., a source deployment 107 or the target deployment 142) 400 starts with step 401, when a monitoring data source, like an agent injected to a monitored environment, a sensor placed by such an agent, or a monitoring data API observed by the monitoring service registers an activity that occurred in the monitored environment.

Monitored activities may contain but are not limited to the processing of transaction requests, sending, and receiving of messages between processes, startup, crash or shutdown of processes, containers, virtualized or not virtualized host computing systems or the provision/removal of virtualized computing systems.

On detection of such activities, a monitoring data source may create one or more monitoring evidence records 240 describing the observed activities and send them to a monitoring server providing monitoring services 131, as described in step 402. The sent monitoring evidence records 240 may also contain deployment correlation data 243 which may be used to assign the source of the monitoring data to a release/delivery entity, like a specific deployment stage or deployment setup, the name or other identifier of a service, an identifier for the version of the service, and data identifying the deployment component containing the service functionality, like an identifier for a container image or process executable.

In following step 403 a monitoring server (not shown) providing the monitoring service 131 may receive the monitoring evidence records to create integrated monitoring and observability intelligence data for monitored deployment environments, like end-to-end transaction trace records describing transactions executed in monitored deployment areas, topological descriptions of components of monitored deployment environments describing components of those deployment environments and their dependencies. Topology elements may describe services offered by a deployment environment and processes providing those services, and described topological dependencies may include call dependencies between services or structural dependencies describing provisioning relationships between services and processes providing them.

Separate topology models may be created for each monitored deployment environment, and those "per stage" or "per deployment" topology models may also contain version information for each deployed component. Deployment correlation data 243 contained in received monitoring evidence data may be used to separate monitoring data for different deployment environment and further to create/update the corresponding "per stage/per deployment" topology model that represents the deployment environment from which the monitoring data was received. Received service identifier 246 and service version 247 data may be used to identify topology elements representing services and to enrich those topology elements with service version data.

The process then ends with step 404.

Process 400 incrementally creates a separate topology model for each monitored deployment environment, including services and service call dependencies, which is enriched with version data for deployed services, and which includes correlation data (in form of stage and deployment identifiers) to identify test records 104 describing tests that were executed in the described monitored deployment environment.

Exemplary topology models of staging/testing and target deployment environments are shown in section 410 of FIG. 4.

A topology model 411 of a first integration testing deployment contains service "D" in version "V1" 412, provided 413 by process "W" in version "V2", service "A" in version "V1", provided 416 by process "X" in version "V2", service "B" in version "V3" provided 419 by process "Y" in version "V1" and service "C" 423 in version "V2", which is provided 422 by process "Z" in version "V3" 421.

Monitored transaction activity in deployment 1 411 revealed service call dependencies 425, 526 and 427, indicating that service "A" 415 called 425 service "C" 423, that service "A" further called 426 service "B" and that service "B" called 427 service "C".

The topology model of second integration testing deployment 430 shows a service "D" 431 in version "V2", provided 432 by process "W" 433 in version "V3", service "A" in version "V1" 434 provided 435 by process "X" in version "V2", service "B" in version "V3" 439 provided 438 by process "Y" 437 in version "V1" and service "C" in version "V3" 442 provided 441 by process "Z" in version "V4". Activity monitoring data revealed service call dependencies from service "A" to service "C" 443 and to service "B" 444, from service "D" to service "C" 445 and from service "B" to service "C" 446.

A topology model 450 of the target/production environment shows service "A" in version "V1" 451 provided 460 by process "X" in version "V2", service "B" in version "V3" provided 455 by process "Y" in version "V1" and service "C" in version "V2" 457 provided 458 by process "Z" in version "V3" 459. Observed service calls revealed a service call dependency 461 from service "A" to service "C", from service "A" to service "B" (dependency 460), and from service "B" to service "C" (dependency 462).

A comparison between integration test deployments 1 410 and 2 430 with the target deployment 450, considering service versions and service call dependencies, that assumes downward compatibility of services (a service of a given version is capable to correctly process all requests that previous versions of the service could process), reveals that a deployment of service "D" in version "V1" to the target environment 450 would be of low risk, as service "D" seems to have no outgoing call dependencies (i.e., does not call other services) in version "V1" as observed call dependency data from integration test deployment 1 410 shows.

A deployment of version "V2" of service "D" to the target environment 450 would not be possible without a prior update of service "C" from version "V2" to version "V3", as service call dependencies reported from integration deployment 2 430 show that service "D" in version "V2" calls service "C" in version "V3".

Deploying service "D" in version "V2" to the target environment and keeping service "C" with version "V2"

imposes the risk that service "D" sends requests to service "C" which service "C" cannot handle in the deployed version "V2", which could result in a failure of the target/production environment.

Only an analysis of deployment states including service call dependencies and version differences between source and target deployments reveals such information which is crucial for a risk-minimizing target update strategy.

Referring now to FIG. 5, which shows flowcharts describing the processing of release requests by the release/delivery automation system and the deployment of a new or updated service to a production environment.

Processing 500 of release requests 101 by the release/delivery automation system 102 starts with step 501, when the release/delivery automation system receives a release request.

Following step 502 creates a testing or staging environment according to the base configuration 210 and the candidate service data 204 received with the release request. Step 502 may first create a new deployment stage 107 in the source area of the execution environment 100, which is isolated from all other deployment stages running in the execution environment. Afterwards, the services specified in base configuration and candidate service data, and in the version specified there, may be deployed to the new deployment stage. Those services may then be configured using service configuration data provided with the release request. Deploying those services may also include deploying deployment packages, like container images, according to received deployment package identifier data 209.

The testing/staging environment created by step 502 represents a test environment for the release candidate service in which tests as specified in the test configuration section 211 of the received release request may be executed.

Following step 503 may then setup the monitoring configuration for the testing environment created by step 502. Step 503 may, e.g., manipulate configuration data for services, processes, or containers in a way that monitoring agents are loaded by those components, which then instrument those components with sensors that provide transaction trace, topology, and resource usage data from those instrumented components. Created monitoring data is then sent to a monitoring service component 131 in form of monitoring evidence records 240. Step 503 also includes adapting the configuration of monitoring agents or other components providing monitoring data in a way that created monitoring data includes deployment correlation data 243, containing data to identify the deployment environment from which the monitoring data was received, and in case monitoring data is received from or for a service, also service identification and version data for the monitored service.

Afterwards, step 504 may then execute a sequence of tests, as specified in the test configuration 211 of the received release request. Step 504 may, e.g., send requests as specified by the test configuration to services to create some test stimuli for the test environment. Location data 215 of test definitions 212 may specify the service on which a test should be executed. Subsequent step 505 may capture the responses received for the test requests and compare them with data representing expected responses to determine whether testing was successful or not. The generated test results may then be stored in a test result repository 103 of the release/delivery automation system 102 in form of test records 104. Test records 104 may contain data to identify the deployment in which testing was executed, e.g., in form of stage 221 and deployment 222 identifier.

In addition, test records may contain a test outcome record 224 for each executed test, containing an identifier 225 for the test definition 212 of the test and data describing the outcome 226 of the test execution.

Step 506 may tear down the test environment created by step 502 after test executions are finished. The process then ends with step 507.

The deployment of new services or service versions to a production environment, where only a selected service of a complex service network is updated or added is shown in process 510.

The process starts with step 511 when a request to deploy a specific service with a specific version to a target environment is received. The request may either add a new service to the target environment (no earlier version of the service is present in the target environment) or update a service (a previous version of the service is available in the target environment which should be updated to a newer version) of the target environment. Such a deployment request may be sent manually, by a user of the deployment recommendation system, e.g., after the recommendation system indicated a "deployment with caution", where deviations of incoming dependencies for the deployment candidate service were detected, which do not prevent a deployment, but the recommendation indicates a subsequent update of services contained in those incoming dependencies. For deployment recommendations indicating that both incoming and outcoming dependencies are up-to-date and only the deployment candidate service needs to be deployed or updated, such a deployment request may be sent automatically by the deployment recommendation system.

Following step 512 may then deactivate the production service if required. For example, the production service may operate in multiple instances and those instances may receive load from a load balancer. Step 512 may, e.g., temporarily change the load balancer configuration to exclude a specific instance from load distribution while this service instance is updated. This way, service updates may be performed without any disruption of end-user interactions.

Subsequent step 513 may then perform the installation or update of the service as specified in the received deployment request and following step 514 may then setup monitoring for the new or updated service in a way that monitoring data in form of service call dependency and other topology data, and also transaction trace describing executions of the new or updated service is created and provided to the monitoring service module 131. Step 514 may setup the monitoring configuration of the new or updated service in a way that created monitoring data also contains deployment correlation data 243, containing identification data for the deployment environment in which the service is operating (e.g., a stage identifier 244 and a deployment identifier 246), identification data for the service (e.g., a service identifier 246 and a deployment package identifier 248), and data for the version of the deployed service (e.g., service version 247).

Step 515 may then (re)activate the new or updated service instance, e.g., by configuring a load balancer that distributes incoming traffic load to various service instances to also send a share of incoming traffic to the new or updated service. The process then ends with step 516.

Coming now to FIG. 6, which shows the flow chart of a process that creates deployment recommendations for received service deployment requests by identifying a relevant communication environment for a deployment candidate service and then determining for services contained in the relevant communication environment a difference between the versions of the services deployed in the test environment and the versions of those services deployed in the target environment.

The process starts with step 601 when the deployment recommendation service module 162 receives a deployment request 160.

Following step 602 compares the version of the to be deployed service with the version of the service currently deployed to the target environment. If the currently deployed version is equal to or higher than the version of the service which should be deployed to the target environment, decision step 603 continues with step 604 which indicates an invalid deployment request. The process afterwards ends with step 615.

Deployment of a service version which is already deployed to the target environment does not make sense, as it would not change the target environment, and deployment of a service version that is lower than the version currently deployed to the target environment represents a version downgrade of the target deployment which is not supported by the proposed deployment recommendation service.

If the deployment candidate service is not yet installed in the target environment, or the version of the service that is currently existing in the target environment is lower than the version of the deployment candidate service, the process continues with step 605, which fetches all test records 104 form the test result repository 103 and then fetches for each test record corresponding deployment configuration. Deployment configuration for a test record may be fetched from the base configuration 210 and candidate service 204 data of the release request 101 that triggered the test executions described by the test record.

The fetched deployment configuration data describes the deployment environment in which the tests described by the test record were executed. Step 605 may then sort the combined test record/deployment configuration list according to release request/test execution timestamp. Timestamp data from release requests 203, or data describing the start of test executions may be used for this sorting.

Afterwards, step 606 may filter the combined test record/deployment configuration list by removing those entries that have deployment configurations which do not contain the deployment candidate service in the desired deployment version. In some variants, step 606 may also remove all test record/deployment configuration entries which contain no test configuration that performs a test on the deployment candidate service. Filtering may be performed by determining whether base configuration 210 and candidate service data 204 of a combined test record/deployment configuration entry contains a service deployment data entry 205 with a service identifier 206 that matches the identifier of the candidate service and service version data 207 that matches the desired version of the candidate service. Besides deployment configuration data (204, 210) from a release request 101 that triggered the creation of a test environment, also other meta-data that describes the test environment, like container or pod configuration data may be used if this other meta-data contains information about deployed services and their versions. To remove test record/deployment configuration entries which contain no tests directed to the candidate service, the test location 216 of tests executed in a test environment may be analyzed and test record/deployment configuration entries containing no test with a location that matches the candidate service may be removed. For this type of filtering, step 606 may for each test outcome record 224 in the test outcome list of a test record 104, query the test definition 212 for the executed test (via matching test identifiers 213/225), and then compare the location data 215 of the test definition with the identifier for the candidate service.

Subsequent optional step 607 may then remove all entries that contain at least one undesired test result (i.e., at least one "test outcome record" indicates "failed" as outcome. In some variants, also entries containing at least one indicating a "warning" outcome may be removed). Step 607 may be omitted in some variant embodiments. Those embodiments may instead execute step 609.

Following step 608 then fetches topology data for remaining list entries, e.g., by fetching "per stage/per deployment" topology model data 133 from the per stage topology repository 132 of the monitoring service module 131. Step 608 may, for each remaining test record 104 in the list select a "per stage/per deployment" topology model with matching stage identifier 221/134 and deployment identifier 222/135. Afterwards, step 608 may use service call dependency data contained in the "per stage/per deployment" topology models to identify the "relevant topology" for the deployment candidate service, by first selecting all services that are directly or indirectly called by the deployment candidate service as "incoming dependencies" of the deployment candidate service. In addition, all services that are directly or indirectly called by the deployment candidate service may be selected as "outcoming dependencies. To detect services of the incoming dependencies of the candidate service, step 608 may start with the topology entity representing the candidate service and the follow service call dependencies against call direction and select all so reachable services as contained in the "incoming dependencies" of the deployment candidate service. The determination of "outgoing dependencies" may be performed analogously by following call dependencies in call direction. A more detailed description of the identification of incoming and outgoing dependencies of a deployment candidate service can be found in FIG. 7.

Following step 609, may be executed as alternative to step 607 in some embodiments. It may identify test record/deployment configuration entries of the list created by step 605 that contain at least one test outcome that indicates an undesired test result (failed, or in some embodiments warning and failed) that were executed on a service that is contained in the "relevant topology" of the deployment candidate service. Step 609 may, for a specific test record/deployment configuration entry, select those test outcome records indicating an undesired test result. Then, the test identifiers 225 of those test results may be used to select the corresponding test definition 212. Afterwards, step 609 may determine whether the service specified in the test location data 215 is either contained in the "relevant topology" for the deployment candidate service or the deployment candidate itself. If at least one test execution with undesired outcome that was located on the deployment candidate service or its "relevant topology" is detected for a test record/deployment configuration entry, it may be removed from the list.

Following decision step 610 determines the number of remaining test record/deployment configuration after previous filtering steps and, in case the list is now empty, continue with step 611 which indicates a failed deployment request due to missing successfully tested deployment configurations. The process then ends with step 615.

Otherwise, step 612 is executed, which may, for each remained test record/deployment configuration calculate for the determined "relevant topology" of the test record/deployment configuration entry, a version difference between the test deployment configuration and the current target deployment configuration. Step 612 may compare the versions of services contained in the "relevant topology" that are referred in the deployment configuration with the versions of the same services deployed in the target environment and then quantify a "version difference" between test and deployment configuration. FIG. 8 proposes approaches to calculate such a version difference between two deployments.

Following step 613 may then use the "version difference" data to select one test deployment configuration as basis for recommended deployment actions based on a selected deployment strategy. As an example, a conservative deployment strategy, having the goal to minimize the number of service updates to keep a stable target environment, may select the test deployment configuration having the smallest version difference. As another example, a more progressive deployment strategy, aiming to keep the target environment up to date and to push new features or fixes to the target as soon as possible, may select the test deployment configuration having the largest version difference.

After a test deployment configuration was selected by step 613, step 614 may then calculate an overall deployment recommendation statement based on the differences between selected test deployment configuration and the status of the target deployment. In addition, step 613 may also calculate a target update plan if updates are required or recommended for services other than the deployment candidate service. A detailed description of the calculation of an overall deployment recommendation statement and a deployment plan can be found in FIGS. 8 and 9.

The process then ends with step 615.

Referring now to FIG. 7, which provides the flowchart of a process for the determination of incoming and outgoing dependencies from for a specific service that is deployed to a service network, from topology data describing this service network and its service call dependencies. Further, FIG. 7 provides an exemplary service network to demonstrate incoming and outgoing dependencies for a given deployment candidate service.

The process 700 to identify the relevant service topology for a candidate service starts with step 701, when a request for relevant service topology calculation is received. Such a request may contain but is not limited to an identifier for a candidate service for which the relevant service topology should be calculated, like the name of the service or other service identification data, and deployment identification data, which identifies the deployment environment for which the relevant service topology for the candidate service should be calculated.

Deployment identification data may contain but is not limited to stage identifier data and deployment identifier data, or other identification data that uniquely identifies a "per stage/per deployment" topology model 133 that at least describes the service topology (deployed services and their call dependencies) of a specific deployment environment that matches the deployment identification data.

Following step 702 may fetch the "per stage/per deployment" topology model 133 identified by the deployment identification data from the per stage topology repository 132 of the monitoring service component 131 and step 703 may then select the service call dependencies graph from the fetched topology model. The service call dependencies graph consists of nodes representing individual deployed services and directed edges representing service calls emitted form a sender or client services and received by a receiver or server service. Direction of those edges may indicate the call direction and may typically point from the sender/client service to the receiver/server service.

Subsequent step 704 then identifies the incoming dependencies of the candidate service, which represents the services that directly or indirectly call the candidate service. Step 704 may first identify the node of the service topology model representing the candidate service, identify service call dependency edges that indicate a call received by the candidate service and then follow those call dependency edges backwards to identify service calling the candidate service. The search may continue recursively on those directly calling services by following incoming service call dependencies against call direction until no more additional services can be reached by following a service call dependency edge against call direction. The so identified service entities may be considered as "incoming dependencies" of the candidate service.

Following step 705 then identifies the outgoing dependencies of the candidate service, as those services that are directly or indirectly called by the candidate service. Step 705 may also start by identifying the topology node representing the candidate service. Afterwards, it may identify service call edges representing calls from the candidate service to other services and follow those edges in call direction to identify services directly called by the candidate service. Step 705 may then recursively follow outgoing service call edges from those services until no other services are reachable. All services visited by step 705 are considered as part of the outgoing dependencies of the candidate service.

Optional step 706 may then analyze vertical dependencies of the services identified by steps 704 and 705 to identify the processes providing those services and further to identify deployment components like executable or component images containing the functionality, in form of executable code, that provides those services. Topology model data created by the monitoring service 131 contains, next to horizontal, communication related dependency data, like service call dependencies derived from service communication activities, also structural or vertical dependency data describing execution or provision related dependencies, like dependencies linking processes to containers or host computing system that execute them, or services to processes providing them.

These vertical dependencies may be exploited to detect for each service contained in the relevant topology of the candidate service, the topology entity representing the process providing the service. Those topology entities may contain descriptive data for the components they represent, like identifiers for process or container images. Such process or container images often represent atomic deployment components, therefore step 706 may fetch this deployment component identifiers, which may be used for the creation of details for deployment recommendations. As an example, deployment recommendations may indicate an update of a specific service to a newer version. To execute these recommendations, it would be helpful to also know the deployment component containing this service version. The deployment component identifiers determined by step 706 may be useful to identify the correct deployment components.

The process then ends with step 707.

An exemplary portion of a "per stage/per deployment" topology model 710 is shown in the right part of FIG. 7 to visualize incoming and outgoing dependencies of a candidate service.

Candidate service 715 is called 723 by service 2 713, which is in turn called 721 by service 1 712. Service 1 also calls 722 service 3 714. Starting from candidate service 715 and following service call dependencies against call directions, it is possible to reach service 2 via dependency 723 and service 1 via dependency 721. It is not possible to reach service 3 714 by following a service call dependency against call direction. Therefore, service 2 713 and service 1 712 belong to the incoming dependencies 711 of the candidate service 715, but not service 3 714.

The outgoing dependencies 716 of the candidate service 715 contain service 4 717, service 5 718 and service 6 719 because they are reachable by following service call dependencies 724 and 725 or 726 in call direction. Service 7 is not part of the outgoing dependencies because it is not reachable from the candidate service by following outgoing call dependencies.

Coming now to FIG. 8, which provides flow charts of processes to determine a release distance between a source and a target deployment environment, either in form of a version difference or in form of a number of required deployments to transform the version state of the target deployment environment to the version state of the source deployment. FIG. 8 also shows a process to calculate an overall release recommendation statement for a deployment candidate serviced from version differences calculated for incoming and outcoming dependencies of the deployment candidate service.

The quantification of a release distance between a test and a target deployment configuration based on version data differences between services deployed to the environments is shown in process 800. It is assumed that for a specific service that is installed in both test and target deployment configuration, the version for the specific service installed in the test environment is always greater or equal to the same service installed in target environment. A service that is available in the test configuration may also be available in the target configuration and all services that are available in the target configuration are also available in the test configuration.

The process starts with step 801, when service deployment configuration data for a test deployment and a target deployment is received. The receives service deployment configuration data also contains version data for deployed services. Alternatively, only a subset of deployment configuration data, like deployment configuration data for the incoming and outcoming dependencies for a deployment candidate service may be received.

Following step 802 may then determine the version for each service deployed to test and target configuration and subsequent step 803 may then calculate for each service a version difference between test and target. Step 803 may use service identification data like a service name to identify corresponding service deployment data for an identified service in test and target configuration. Afterwards it may subtract the test version data from the target version data.

Subtraction of service data may be performed in several ways, depending on the structure of the service information. In the simplest case, service data simply consists of a single number which is incremented with each release. In this case, the service version from target is subtracted from the service version from test to get the service version difference.

A more complex difference calculation may be applied in case a more structured versioning scheme is used, like the "semantic versioning" scheme, which defines version sections "major", "minor", and "bugfix". Differences in the "major" section indicate an incompatible functionality and interface changes, differences in the "minor" section indicate a compatible interface change and changes in the "bugfix" section indicate a change of internal functionality that does not affect the functionality of interfaces of the component or service. In such cases, a combination of "minor" and "bugfix" sections may be mapped to a numeric value, e.g., by multiplying "minor" with a specific factor and then adding the "bugfix" value to the result.

Differences to the "major" sections indicate a "breaking" change, which means that a service with an increased "major" version may not be capable to communicate with the same services in the same versions as the version with the original "major" version did. This violates the assumption of the deployment recommendation service 162 that updated service versions are always compatible with older versions. Therefore, processing may be stopped, and a warning may be issued by this process indicating that manual intervention is necessary, when a "major" version update was detected.

Following step 804 may then calculate the sum of the per service version differences calculated by step 803 and provide the result of the calculation as release distance score.

The calculation of a distance score based on the number of service updates that are required to transfer the service version status of a target deployment environment into the service version status of a test deployment is described in process 810.

The process starts with step 811, when a test and a target deployment configuration are received. The same constraints for the target and deployment configuration as already described for process 800 apply.

Step 812 may, for each service that exists in the test configuration, determine whether the target configuration contains a corresponding service. If a corresponding service (i.e., having the same service name or other service identification data) exists in the target configuration, step 812 may determine whether the version of the service in the test configuration differs from the version of the service in the target configuration.

Following step 813 may then provide the number of services requiring an update or an initial installation to transform the version state of target environment into the version state of the test environment as release distance score.

Flowchart 820 describes a process to calculate deployment recommendations for a deployment candidate service based on differences between a selected test environment and the target environment that were identified in the incoming and outcoming dependencies of the deployment candidate service.

The process starts with step 821, when data for deployment candidate service, together with a set of test deployment configurations that passed the checks performed by step 606 and 607 or 609 of process 600 is received. Relevant topology may also have been determined for each test deployment, e.g., as described in process 700. The provided relevant topology data may distinguish between incoming and outgoing dependencies.

In addition, a release distance score, based on the identified relevant topology may have been calculated for each received test deployment configuration, e.g., as described in process 800 or 810.

Following step 822 may, based on the calculated release distance scores and based on a previously determined deployment strategy, select the test deployment configuration that best matches the deployment strategy. A first example deployment strategy may aim to keep the target environment as stable as possible and therefore select the test environment with the smallest release distance score, as a small release distance score indicates that test and target deployment are similar. Therefore, also the number of service updates that are required to align the target deployment with the selected source deployment is small.

Another exemplary deployment strategy may aim to keep the target environment as up to date as possible, to make new features and bug fixes available in the target environment as soon as possible. Such a deployment strategy would select the test environment with the highest release distance score, as this causes the most updates to the target environment.

After a specific test environment was selected by step 822, following step 823 may then determine for the incoming dependencies and the outgoing dependencies that were determined for the deployment candidate service whether differences to the target environment exist. Step 823 may calculate a separate release distance score for incoming and outcoming dependencies and use a release distance score of 0 as indicator for no difference and each other score as indicator for an existing difference.

Following decision step may in case no differences were detected for both incoming and outgoing dependencies of the deployment candidate service, continue with step 825 which indicates the deployment of the service. In this case, also an automated deployment of the service may be performed. The process then ends with step 830.

If differences are detected in either incoming or outgoing dependencies, the process continues with decision step 826, which determines whether there were differenced detected in the outgoing dependencies of the deployment candidate service.

If differences in the outgoing dependencies were detected, the process continues with step 828, which indicates that a deployment is not possible.

In case no difference in the outgoing dependencies were detected, the process continues with step 827, which indicates that a deployment with caution is possible. A full match of outgoing dependencies indicates that the services to which the deployment candidate service sends its requests are capable to understand and process all types of requests that the new service version may send. Potential differences in the incoming dependencies indicate that the services that send requests to the deployment candidate service may not yet be capable to send all types of requests that the new service version can handle. This may not be an optimal situation, but it is no hindrance for the deployment of the candidate service. Therefore, an indication of a "deployment with caution", which does not suggest an automated deployment, but requires manual verification, is justified.

Step 829 is executed after step 827 or 828 and calculates a deployment plan based on the detected differences between the selected test configuration and identified service call dependencies. The calculated release plan may then be presented to a user of the deployment recommendation service. A detailed description of the calculation of a deployment plan can be found in FIG. 9.

The process then ends with step 830.

The calculation of a deployment plan for secondary service deployments that are required for the deployment of a specific candidate service for which deployment recommendations were requested is described in FIG. 9.

The flowchart of a process 900 to calculate a deployment plan considering service call dependencies using topological sorting of communication services is depicted in the left part of FIG. 9 and a flowchart of a process 920 that selects an optimal topological sorting for deployment plan calculation is shown on the right part of FIG. 9.

Calculation of a deployment plan starts with step 901, when a request for deployment call calculation, including a selected test configuration, the relevant topology for the deployment candidate service and the target configuration is received.

Following step 902 may calculate a reverse topological sorting for the services contained in received relevant topology. Topological sorting or ordering is defined for directed graphs as list of nodes contained in the graph, where the sequence of the nodes in the list is derived from the edges connecting the nodes. Algorithms to calculate the topological sorting of graphs are known in the art, one example of such an algorithm is "Kahn's algorithm", described in "Topology sorting of large networks", 1962 by A. B. Kahn. In a list representing the topological order of a graph, a first node originating an outgoing edge to a second node is located before the second node. Reverse topological ordering inversely interprets the direction of edges. Therefore, a reverse topological sorting of a graph list nodes receiving incoming edges before nodes emitting those edges. For a service call dependency model reverse topological sorting creates a list in which a service that receives requests from other services is listed before those other services.

Under the assumption of service downwards compatibility, where an updated version of a service provides a superset of the functionality it provided before the update, a reverse topological sorting may be used to specify an update sequence that guarantees that a service is only updated after all services to which the service sends requests were updated before.

Consequently, a service is only updated after all other services to which it sends requests were updated before and therefore are capable to receive and process all types of requests that the service may send after its update.

After step 902 created a topological sorting of the services contained in the received relevant topology, step 903 may select the first service of the topological sorted list of services and use it as current service for subsequent processing.

Following decisions step 904 checks whether the current service is already present in the target environment. Step 904 may use a service name or other service identification data extracted from the current service to determine whether a version of the current service is already deployed to the target environment.

If no matching service is found in the target environment, step 906 is executed which adds a deployment plan step 313 to the deployment plan 312 indicating a new deployment of the current service. A deployment step may contain but is not limited to an identifier for a service that is to be deployed, version data describing the version of the service, which is to be deployed, optional configuration data for the to be deployed service and an indicator determining whether the deployment step describes a new installation of a service or an update of an already deployed one.

If decision step 904 determines that a version of the current service is already installed in the target configuration, decision step 905 is executed which compares the version data for the currently processed service with the version data for the corresponding service (i.e., serviced deployed to the target environment with service identification data matching the service identification data for the currently processed service) currently installed in the target deployment.

If version data does not match, which indicates the corresponding service currently installed in the target environment needs to be updated, step 907 is executed which adds a new deployment plan step indicating the update of the corresponding service to the version indicated by the currently processed service. Decision step 908 is executed after step 906, 907 or if decision step 905 detected a version match. Step 908 determines whether a next service is available in the list generated by step 902. If a next service is available, step 909 is executed, which fetches the next service on the list as current service and then proceeds with step 904.

If otherwise no more service is available in the list, step 910 is executed which provides the created deployment plan for further processing, storage, or visualization.

The process then ends with step 911.

For more complex deployments with numerous services and service dependencies, where also parallel service dependency paths exist, multiple reverse topological orderings are possible. As a simple example, a service "A" may call both service "B" and "C". Valid reverse topological orderings are "B", "C", "A" and "C", "B", "A". Although both ordering variants describe service update sequences that guarantee that a service is only updated after all other services it calls are updated, one of those orderings may be more suitable than the other one. As an example, successful tests may be available for a deployment containing only an updated service "C", but no successful tests may be available for an environment containing only an updated service "B". Therefore, the available successful tests indicate that update sequence "C", "B", "A" should be preferred over "B", "C", "A".

Flowchart 920 provides a process to determine an optimal topological sorting for the creation of a deployment plan by considering the existence of successful tests for intermediate deployment states.

The process starts with step 921, when a request for the calculation of an optimal reverse topological sorting is received. The received request may contain the selected test configuration, the determined relevant topology for a deployment candidate service and the target configuration.

Subsequent step 922 may then calculate all possible reverse topological orderings for the received relevant topology and following step 923 may then calculate a deployment plan for each reverse topological ordering calculated by step 922. To calculate all possible topological orderings, a slightly adapted version of Kahn's algorithm may be used. This adapted version of the algorithm may, in situations where the next node that is to be appended to the ordering can be selected form multiple equivalent nodes, not chose only one permutation of those equivalent nodes, but calculate separate topological orderings of the graph for all permutations of those equivalent nodes.

Step 923 may execute steps 903 to 910 of process 900 for each reverse topological ordering determined by step 922 to calculate those deployment plans.

Following step 924 may then for each calculated deployment plan simulate the described service update sequence on the received target configuration. This simulation may start with the original target configuration and then sequentially change the target configuration data by sequentially applying the deployment steps of the deployment plan on the target configuration data. It should be noted that not the target deployment itself is updated, but only the configuration data describing it.

After each applied deployment step, the test result repository 103 of the release delivery automation module 102 may be queried for test records 104 containing no undesired test outcomes (e.g., no "fail" or no "fail" and "warn" outcomes), which were executed in a test environment that matched the target configuration after application of the current deployment step.

To determine the configuration of the test environment for a selected test record, step 924 may select a release request with matching stage identifier 201/221 and deployment identifier 202/222, and then compare service deployment data 205 contained in the base configuration section 210 and the candidate service section 204 of the identified release request with the deployment state represented by the target configuration after application of the current deployment step.

Step 924 may count for each calculated deployment plan the number of deployment steps for which no successful test record was found that was executed in a matching test configuration.

Subsequent step 925 may then select a deployment plan based on the number of deployment steps for which no matching successful test execution was found. Step 925 may select the deployment plan having the lowest number of deployment steps for which no successful matching test execution was found. Alternatively, step 925 may issue an indication that deployment is not possible if no sequence of deployment steps was found for which the number of deployment steps with no successful test execution is zero.

The process then ends with step 926.

Coming now to FIG. 10, which exemplary describes the selection of an optimal deployment plan based on reverse topological orderings and past successful test execution that were executed in test configuration matching individual deployment steps.

FIG. 10 shows a selected source configuration 1000, a target configuration 1010 and a set of successfully tested configurations 1040. Further it contains a list of reverse topological sorting variants for the selected source configuration and target state variants derived from an application of deployment steps according to different reverse topological sorting variants. Finally, it explains 1052 why a specific reverse topological sorting is selected to generate a deployment plan.

The selected source configuration 1000 contains service "S1" in version "V2" 1001, service "S3" in version "V4" 1002 and service "S2" in version "V3" 1003. Monitored service communication activity reveled a service call dependency 1004 from service "S1" 1001 to service "S3" 1002 and another service call dependency 1005 from service "S1" to service "S2".

Even for this small service configuration already two different topology sorting variants 1020 and 1030 are available, having a different sequence for services S3 and S4.

The current target configuration 1010 has service "S1" in version "V1" 1011, service "S3" in version "V2" 1012 and service "V3" in version "V2" deployed. A service call dependency 1014 was detected between services "S1" and "S3" and another dependency 1015 was detected between "S1" and "S2".

Listed target state variants 1021 and 1031 describe the state of the target configuration after each update step according to a reverse topological sorting derived from the source config. Target state variant 1021, which describes the states of the target configuration that would result by applying an update sequence derived from topological sorting 1020. The sequence of target states contains state 1022 with "S3" in version "V4", "S2" in version "V1" and "S1" in version "V1" after update of service "S3" to version "V4"

according to the first entry of topological sorting 1020, followed by state 1023 with "S3" in version "V4", "S2" in version "V3" and "S1" in version "V1" after an update of "S2" to version "V3" according to the second entry of topological sorting 1020. Finally, target state variant 1021 contains state 1024 in which "S1" was updated to version "V2" according to the last entry of topological sorting 1020, together with "S3" in version "V4" and "S2" in version "V3".

Target state variant 1031 is derived from topological sorting 1030, in which the sequence of "S2" and "S3" are reverted compared to topological sorting 1020. Therefore, also the target states show that first service "S3" is updated, then "S2" and finally S1"," reaching to the same end state as update variant 1021.

A history of test executions 1040 shows successful test executions in deployment variants 1041, 1042 and 1043. Deployment variant 1041 used service configuration "S3" in version "V2", "S2" in version "V3" and service "S1" in version V1, deployment variant 1042 had "S3" in version "V4", "S2" in "V3" and "S1" in version "V1" and deployment variant 1043 used service "S3" in version "V2", "S2" in "V3" and "S1" in "V/2".

A comparison 1052 of target deployment states of the two deployment state variants 1021 and 1031 with successfully tested configurations 1040 reveals that all deployment states of variant 1030 correspond to successfully tested configurations, whereas for deployment state variant 1021, no corresponding successfully tested configuration can be found for deployment state 1022 with "S3" in "V4", "S2" in "V2" and "S1" in "V1". Therefore, topological sorting B 1030 is selected as basis for a deployment plan.

Referring now to FIG. 11, which shows a screenshot of an exemplary visualization of a deployment recommendation 164. The visualized recommendation indicates a "deployment with caution", which may be represented with a specific color coding. An exemplary color coding scheme may use color green for no identified deviations between source and target deployment except the version of the deployment candidate service, yellow for identified deviations in incoming dependencies to indicate a "deployment with caution", or red for identified deviations in outgoing dependencies to indicate that deployment is not possible.

A general deployment statement 1100 may indicate that deployment of the candidate service (recommendation-service in version 0.7.0) is possible. To indicate that this deployment should be performed with caution, either the text or the icon preceding the text may be colored in yellow.

A deployment plan 1110 may enumerate proposed deployment steps. In the depicted recommendation, all outgoing dependencies of the deployment candidate service are up to date, which is indicated by the first entry of the deployment plant 1111. Following entry 1112 suggests the deployment of the deployment candidate service and final entry 1113 the deployment of a service (frontend in version 0.7.0) that calls the deployment candidate service.

A call graph 1120 depicts the relevant service topology of the deployment candidate service including contained services and observed service call dependencies. The displayed exemplary visualization of the call graph also contains information about the version differences between source and target deployment, where services depicted using a dot and dash line indicate a match between source and target and services drawn using a dashed line indicate services that are deployed in source but not yet deployed in the target environment. A solid line may be used to represent the deployment candidate service.

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An automated deployment method for deploying a computer service into a distributed computing environment, comprising:
   receiving, by a deployment recommendation service, a deployment request for deployment of a candidate service into a target computing environment, where the deployment request includes an identifier for the candidate service and a version number for the candidate service;
   identifying, by the deployment recommendation service, call dependencies between the candidate service and other services in the target computing environment by accessing a topology model, where the topology model represents call dependencies between services deployed in the target computing environment;
   for each identified call dependency, comparing, by the deployment recommendation service, version of a given service in a given test computing environment with version of a corresponding service in the target computing environment, where the given service has a call dependency with the candidate service and the candidate service is deployed in the given test computing environment; and
   providing, by the deployment recommendation service, a deployment recommendation for the candidate service into the target computing environment based on version differences in at least one service having a call dependency with the candidate service.

2. The deployment method of claim 1 further comprises selecting, by the deployment recommendation service, the given test environment from a group of test environments, where the version number of the candidate service deployed to the test environment matches the version number received with the deployment request; where the selection of the test environment is further based on a result of at least one test executed in the test environment.

3. The deployment method of claim 1 further comprises retrieving, by the deployment recommendation service, test records from a test result repository, where each test record indicates a deployment configuration in which tests described in the test record were executed, and the deployment configuration identifies services in the test computing environment and a version number for the services;
   for each deployment configuration, comparing version of a given service in the test computing environment with version of a corresponding service in the target computing environment;
   for each deployment configuration, quantifying, by the deployment recommendation service, version differences between services associated with each deployment configuration and services in the target computing environment; and
   selecting, by the deployment recommendation service, a given deployment configuration based on the quantified version differences, where the given deployment configuration defines the given test environment.

4. The deployment method of claim 3 wherein retrieving test records from a test result repository further comprises identifying test records with a deployment configuration that excludes the candidate service and removing the identified test records.

5. The deployment method of claim 3 wherein retrieving test records from a test result repository further comprises identifying test records that indicates an undesired test outcome and removing the identified test records.

6. The deployment method of claim 1 wherein providing a deployment recommendation further comprises recommending against deploying the candidate service in response to a determination of a version difference with a particular service having a call dependency with the candidate service, where the identified call dependencies indicate that the particular service has a descendent relationship with the candidate service.

7. The deployment method of claim 1 wherein providing a deployment recommendation further comprises recommending deployment with caution in response to a determination of a version difference with a particular service having a call dependency with the candidate service, where the identified call dependencies indicate that the particular service has an ancestor relationship with the candidate service.

8. The deployment method of claim 1 wherein providing a deployment recommendation further comprises recommending deployment in response to a determination of no version differences amongst services having a call dependency with the candidate service.

9. The deployment method of claim 1 wherein providing a deployment recommendation further comprises deploying the candidate service in the target computing environment in response to a determination of no version differences amongst services having a call dependency with the candidate service.

10. The deployment method of claim 1 further comprises creating a deployment plan for the target computing environment, where the deployment plan specifies a sequence of updates to services in the target computing environment and the sequence of updates accounts for backward compatibility of the services.

11. The deployment method of claim 1 further comprises creating a reverse topological order for services having a call dependency with the candidate service, identifying one or more services from the services having a call dependency with the candidate service for which the version deployed to the given test computing environment is higher than the version deployed to the target computing environment, and adding the identified one or more services to the sequence of updates in accordance with the reverse topological order, where a given service in the reverse topological order is listed before services from which the service receive requests.

12. The deployment method of claim 1 further comprises comparing, by the deployment recommendation service, the version number of the candidate service to version number of the corresponding service deployed in the target computing environment; and rejecting, by the deployment recommendation service, the deployment request in response to the version number of the candidate service being equal to or less than the version number of the corresponding service deployed in the target computing environment.

13. A non-transitory computer-readable medium having computer-executable instructions that, upon execution of the instructions by a processor of a computer, cause the computer to perform:

receiving a deployment request for deployment of a candidate service into a target computing environment, where the deployment request includes an identifier for the candidate service and a version number for the candidate service;

comparing the version number of the candidate service to version number of the corresponding service deployed in the target computing environment;

rejecting the deployment request in response to the version number of the candidate service being equal to or less than the version number of the corresponding service deployed in the target computing environment;

identifying call dependencies between the candidate service and other services in the target computing environment by accessing a topology model, where the topology model represents call dependencies between services deployed in the target computing environment;

for each identified call dependency, comparing version of a given service in a given test computing environment with version of a corresponding service in the target computing environment, where the given service has a call dependency with the candidate service and the candidate service is deployed in the given test computing environment; and providing a deployment recommendation for the candidate service into the target computing environment based on version differences in at least one service having a call dependency with the candidate service.

14. The non-transitory computer-readable medium of claim 13 having computer-executable instructions that further cause the computer to perform to: select the given test environment from a group of test environments, where the version number of the candidate service deployed to the test environment matches the version number received with the deployment request; where the selection of the test environment is further based on a result of at least one test executed in the test environment.

15. The non-transitory computer-readable medium of claim 13 having computer-executable instructions that further cause the computer to perform to:

retrieve test records from a test result repository, where each test record indicates a deployment configuration in which tests described in the test record were executed, and the deployment configuration identifies services in the test computing environment and a version number for the services;

for each deployment configuration, compare version of a given service in the test computing environment with version of a corresponding service in the target computing environment;

for each deployment configuration, quantify version differences between services associated with each deployment configuration and services in the target computing environment; and select a given deployment configuration based on the quantified version differences, where the given deployment configuration defines the given test environment.

16. The non-transitory computer-readable medium of claim 15 having computer-executable instructions that further cause the computer to identify test records with a deployment configuration that excludes the candidate service and remove the identified test records.

17. The non-transitory computer-readable medium of claim 15 having computer-executable instructions that further cause the computer to identify test records that indicates an undesired test outcome and remove the identified test records.

18. The non-transitory computer-readable medium of claim 13 having computer-executable instructions that further cause the computer to recommend against deploying the candidate service in response to a determination of a version difference with a particular service having a call dependency with the candidate service, where the identified call dependencies indicate that the particular service has a descendent relationship with the candidate service.

19. The non-transitory computer-readable medium of claim 13 having computer-executable instructions that further cause the computer to recommend deployment with caution in response to a determination of a version difference with a particular service having a call dependency with the candidate service, where the identified call dependencies indicate that the particular service has an ancestor relationship with the candidate service.

20. The non-transitory computer-readable medium of claim 13 having computer-executable instructions that further cause the computer to recommend deployment in response to a determination of no version differences amongst services having a call dependency with the candidate service.

21. The non-transitory computer-readable medium of claim 13 having computer-executable instructions that further cause the computer to deploy the candidate service in the target computing environment in response to a determination of no version differences amongst services having a call dependency with the candidate service.

22. The non-transitory computer-readable medium of claim 13 having computer-executable instructions that further cause the computer to create a deployment plan for the target computing environment, where the deployment plan specifies a sequence of updates to services in the target computing environment and the sequence of updates accounts for backward compatibility of the services.

23. The non-transitory computer-readable medium of claim 13 having computer-executable instructions that further cause the computer to create a reverse topological order for services having a call dependency with the candidate service, identify one or more services from the services having a call dependency with the candidate service for which the version deployed to the given test computing environment is higher than the version deployed to the target computing environment, and add the identified one or more services to the sequence of updates in accordance with the reverse topological order, where a given service in the reverse topological order is listed before services from which the service receive requests.

* * * * *